(12) United States Patent
Hsu

(10) Patent No.: US 9,274,990 B2
(45) Date of Patent: Mar. 1, 2016

(54) INTERFACE DEVICE CAPABLE OF SUPPORTING UNKNOWN I/O DEVICE

(71) Applicant: Yi-Hong Hsu, New Taipei (TW)

(72) Inventor: Yi-Hong Hsu, New Taipei (TW)

( * ) Notice: Subject to any disclaimer, the term of this patent is extended or adjusted under 35 U.S.C. 154(b) by 0 days.

(21) Appl. No.: 14/341,546

(22) Filed: Jul. 25, 2014

(65) Prior Publication Data

US 2015/0032919 A1 Jan. 29, 2015

(30) Foreign Application Priority Data

Jul. 26, 2013 (TW) .............................. 102126972 A

(51) Int. Cl.
*G06F 13/12* (2006.01)
*G06F 13/38* (2006.01)
*G06F 3/00* (2006.01)

(52) U.S. Cl.
CPC .................................... *G06F 13/385* (2013.01)

(58) Field of Classification Search
None
See application file for complete search history.

(56) References Cited

U.S. PATENT DOCUMENTS

2005/0273312 A1\* 12/2005 Sandulescu et al. ............ 703/25
2010/0146146 A1\* 6/2010 Welts et al. .................... 709/237

\* cited by examiner

*Primary Examiner* — Henry Tsai
*Assistant Examiner* — Dean Phan
(74) *Attorney, Agent, or Firm* — Tracy M Heims; Apex Juris, Pllc

(57) ABSTRACT

An interface device capable of supporting an unknown I/O device comprises: a transmission module, used for receiving a control signal sent by an I/O device and sending a feedback signal to the I/O device; a signal process module, used for generating a control indicating signal according to the control signal and generating the feedback signal according to a feedback indicating signal; and a USB interface, used for sending the control indicating signal to a data process device and receiving the feedback indicating signal from the data process device; wherein, information content of the control indicating signal and information content of the feedback indicating signal both comprise the information of a first device description unit and a first interaction description unit contained in a first device index chart.

10 Claims, 6 Drawing Sheets

INTERFACE DEVICE CAPABLE OF SUPPORTING UNKNOWN I/O DEVICE

BACKGROUND OF THE INVENTION

1. Field of the Invention

The present invention relates to an interface device, especially to an interface device used for expanding the connection capability of an I/O device of a data process device.

2. Description of Related Art

In a conventional data process device having a USB port, expanding I/O device through the USB port requires a corresponding driver program during the installation. For increasing the system safety and lowering the operation difficulty, many closed-type data process devices, such as a tablet computer, smart phone, smart TV and set top box are provided with a closed-type driver program installation policy, so a user is not allowed to install a driver program by himself by using the I/O device, only preset driver programs are allowed thereby small amount of I/O devices being supported. As such, the preset expansion terminals can also be used for supporting a general I/O device such as a conventional keyboard, mouse or joystick.

When a new I/O device is desired to be supported by the closed-type data process device, a corresponding driver program is required to be added by the original developer in the updated software, then the closed-type data process device is called back by the developer for updating the software. Because the cost for updating and maintaining software is enormous, the software update of many closed-type data process devices would be terminated and only very small amounts of I/O devices are supported. As such, many closed-type data process devices are formed with one or more USB ports, but an objective of freely expanding I/O device is hard to be achieved.

In a conventional opened-type data process device formed with USB expanding terminals and provided with an opened-type driver program installation policy, such as a personal computer and notebook computer, when a plurality of I/O devices are desired to be used, the quantity of USB ports are often not enough. A conventional USB hub is able to support a plurality of I/O devices, but a driver program corresponding to each I/O device has to be firstly installed. If ten different I/O devices are desired to be used, ten driver programs have to be installed thereby causing inconvenience.

For solving the above-mentioned problems, providing an interface device allowing an I/O device which is not supported to still be capable of being operated in the operation system without requiring a new driver program being updated in the data process device shall be seriously concerned.

SUMMARY OF THE INVENTION

One primary objective of the present invention is to provide an interface device capable of supporting an unknown I/O device, which allows an I/O device which is not supported to still be capable of being operated in the operation system without requiring a new driver program being updated in a data process device.

For achieving above-mentioned objective, the present invention provides an interface device capable of supporting an unknown I/O device, which comprises:

a transmission module, used for receiving a control signal sent by an I/O device and sending a feedback signal to the I/O device;

a signal process module, used for generating a control indicating signal according to the control signal and generating the feedback signal according to a feedback indicating signal; and a USB interface, used for sending the control indicating signal to a data process device and receiving the feedback indicating signal from the data process device;

wherein, information content of the control indicating signal and information content of the feedback indicating signal both comprise the information of a first device description unit and a first interaction description unit contained in a first device index chart.

According to one embodiment of the present invention, the data process device comprises a driver program, when the driver program is able to identify the I/O device through the first device index chart, a second device index chart is established; when the driver program is unable to identify the I/O device through the first device index chart, a third device index chart is established, wherein columns of the second device index chart comprise a second device description unit and a second interaction description unit, columns of the third device index chart comprise a third device description unit and a third interaction description unit, and the third interaction description unit comprises raw data.

According to one embodiment of the present invention, the I/O device comprises an interaction module and an I/O transmission module.

According to one embodiment of the present invention, the interaction module comprises a control interface.

According to one embodiment of the present invention, the interaction module comprises a feedback interface.

According to one embodiment of the present invention, the interaction module comprises a control interface and a feedback interface.

According to one embodiment of the present invention, the I/O transmission module comprises a wired unit.

According to one embodiment of the present invention, the I/O transmission module comprises a wireless unit.

According to one embodiment of the present invention, the I/O transmission module comprises a wired unit and a wireless unit.

According to one embodiment of the present invention, the data process device further comprises an application program interacting with the I/O device through the driver program.

According to one embodiment of the present invention, the application program processes by a raw data format when the driver program is unable to identify the I/O device.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
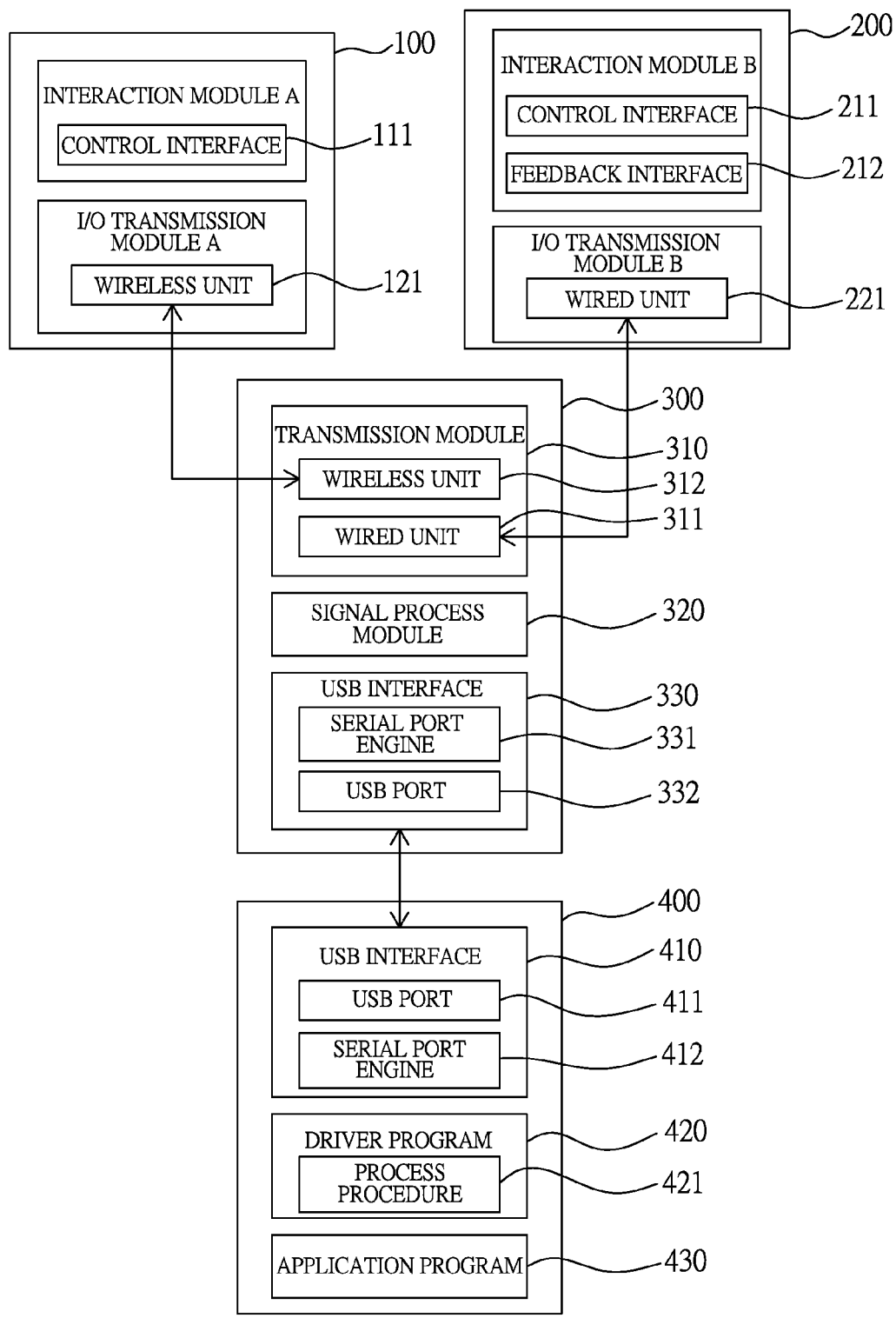
FIG. 1 is a schematic view illustrating an interface device of the present invention being connected to two I/O devices and a data process device according to one embodiment of the present invention.

Referring to FIG. 1, which is a schematic view illustrating an interface device of the present invention being connected to two I/O devices and a data process device according to one embodiment of the present invention. As shown in FIG. 1, an interface device 300 is respectively coupled to an I/O device 100, an I/O device 200 and a data process device 400.

The I/O device 100 is a wireless mouse and formed with a control interface 111 and a wireless unit 121. The control interface 111 is able to generate a control signal according to the input operation performed by a user, and the wireless unit 121 is served to send the control signal to the interface device 300.

The I/O device 200 is a force feedback wheel and formed with a control interface 211, a feedback interface 212 and a wired unit 221. Wherein, the control interface 211 is formed as a wheel-like control interface which is able to generate a control signal according to the input operation performed by the user. The feedback interface 212 is formed as a feedback interface capable of providing vibration and rotating resistance and used for generating the above-mentioned vibration and rotating resistance according to a feedback signal. The wired unit 221 is served to send the control signal to the interface device 300, and a feedback signal is received by the interface device 300.

Generally speaking, each I/O device comprises an interaction module and an I/O transmission module, wherein the interaction module is formed with a control interface and/or a feedback interface according to different requirements, and the I/O transmission module is formed with a wired unit and/or a wireless unit. One main function of the I/O device is to enable the control interface to generate a control signal through a means of touch, pressure, sound wave, optical wave, electromagnetic wave, gravity, acceleration or other physical or chemical sensing means, and the control signal is sent to a data process device through the I/O transmission module; the I/O transmission module receives a feedback signal from the interface device 300 and allows the feedback signal to be presented on the feedback interface by a means of acousto-optic, vibration, altering mechanism or altering temperature or other physical or chemical altering means.

The interface device 300 comprises a transmission module 310, a signal process module 320 and a USB interface 330. The transmission module 310 comprises a wired unit 311 and a wireless unit 312 for respectively receiving a control signal A from the I/O device 100 and a control signal B from the I/O device 200, and the signal process module 320 allows the received control signal A or control signal B to be sent to the data process device 400 through the USB interface 330, and the signal process module 320 is also able to receive the feedback indicating signal of the data process device 400 through the USB interface 330 thereby allowing the feedback indicating signal to be processed and sent to the I/O device 200 through the wired unit 311 of the transmission module 310. The USB interface 330 comprises a serial port engine 331 and a USB port 332 for bidirectionally communicating with the data process device 400.

The data process device 400 comprises a USB interface 410, a driver program 420 and an application program 430. The USB interface 410 comprises a USB port 411 and a serial port engine 412. The USB port 411 is able to be connected to the USB port 332 of the interface device 300, and the serial port engine 412 is able to bidirectionally communicate with the interface device 300 by a standard USB format. The driver program 420 is stored in a first memory media and served to process the signal from the interface device 300, so the application program 430 is enabled to obtain the content of the control signal A or the control signal B through a process procedure 421, wherein the first memory media is a hard disk or a solid-state memory device. The application program 430 is stored in a second memory media and served to send the feedback indicating signal B to the interface device 300 through the process procedure 421 of the driver program 420, then the content of the feedback indicating signal B is sent to the I/O device 200 through the interface device 300, wherein the second memory media is a hard disk or a solid-state memory device.

Figure 2A:
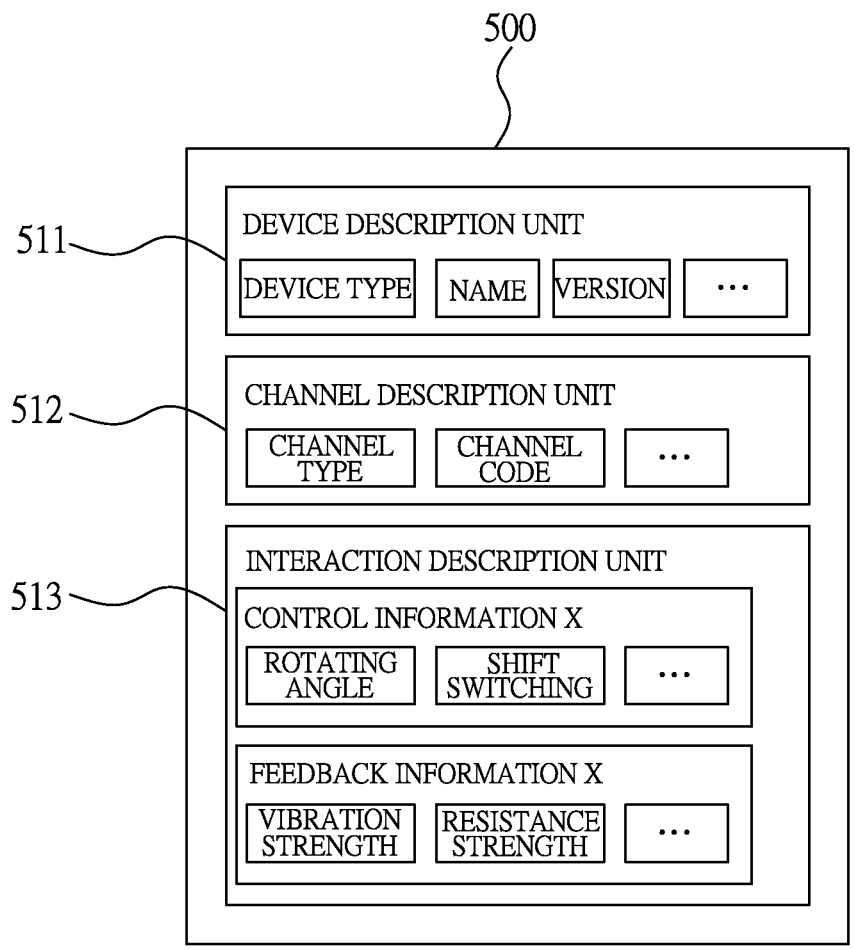
FIG. 2a is a schematic view illustrating the interface device shown in FIG. 1 being formed with a first device index chart according to one embodiment of the present invention.
Figure 2B:
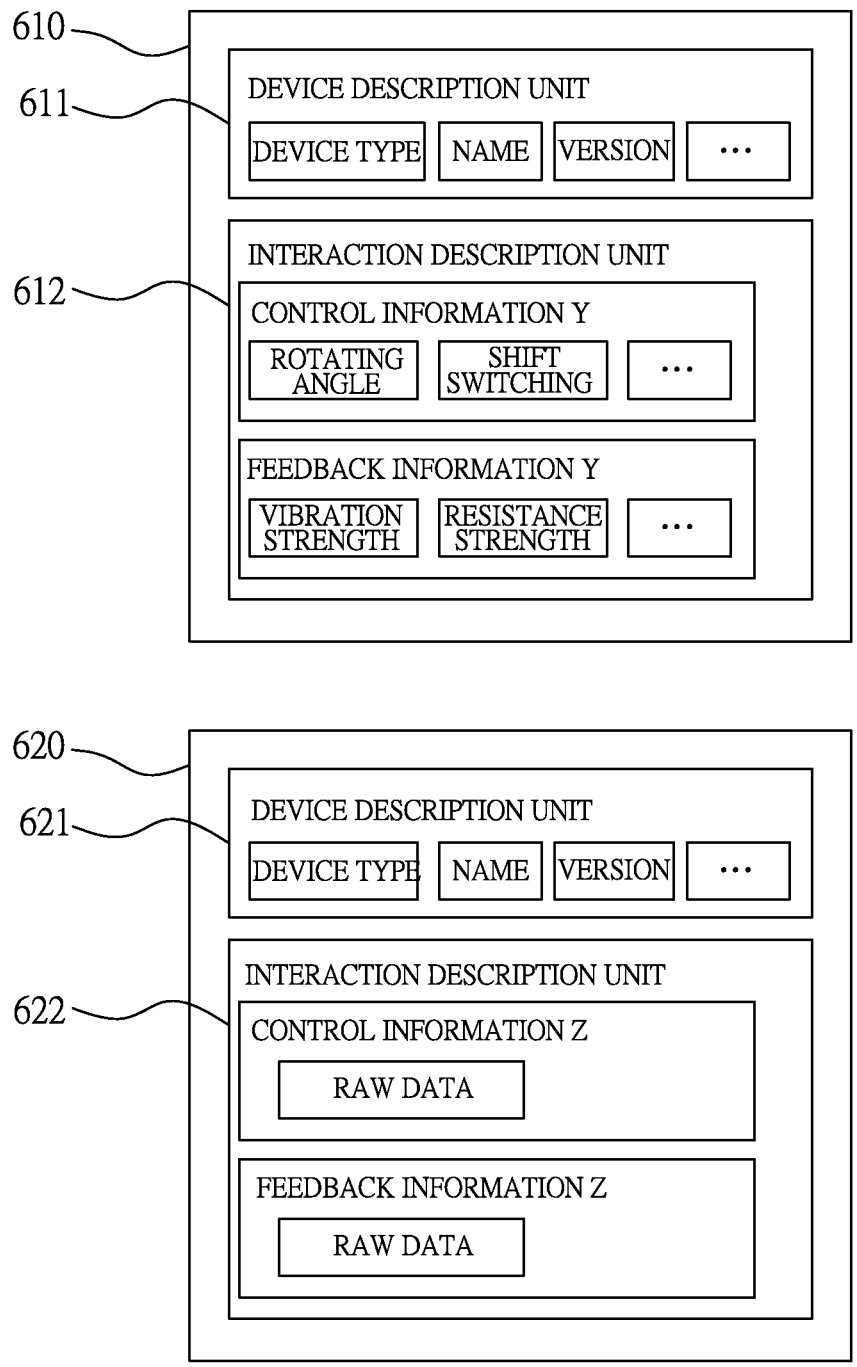
FIG. 2b is a schematic view illustrating a second device index chart or a third device index chart being formed by a driver program of the data process device shown in FIG. 1 according to one embodiment of the present invention.

For allowing the control signal and the feedback signal to be correctly read, a device index chart is provided in the interface device 300 and a device index chart is provided in the driver program 420. Referring to FIG. 2a and FIG. 2b, wherein FIG. 2a is a schematic view illustrating the interface device shown in FIG. 1 being formed with a first device index chart according to one embodiment of the present invention and FIG. 2b is a schematic view illustrating a second device index chart or a third device index chart being formed by a drive program of the data process device shown in FIG. 1 according to one embodiment of the present invention.

As shown in FIG. 2a, after the interface device 300 is connected to the I/O device 200, a first device index chart 500 is established through the signal process module 320 and columns thereof comprise a device description unit 511, a channel description unit 512 and an interaction description unit 513; wherein, the device description unit 511 defines the relevant information of the I/O device 200, such as device type, name and version, etc.; the channel description unit 512 defines the relevant information of the used communication channel, such as channel type and channel code, etc.; the interaction description unit 513 defines the content of each active control signal through a control information X, and a feedback information X is served to define the content of each active feedback signal; for example when the I/O device 200 is a force feedback wheel, the control information X can indicate the rotating angle of the force feedback wheel or the status of a gear, and the feedback information X can indicate the strength the force feedback wheel should vibrate and the resistance strength that should be generated during rotation.

As shown in FIG. 2b, after the interface device 300 and the I/O device 200 are connected, a second device index chart 610 or a third device index chart 620 is established through the driver program 420. Columns of the second device index chart 610 comprise a device description unit 611 and an interaction description unit 612, wherein the device description unit 611 defines the relevant information of the I/O device 200, such as device type, name, version, etc.; the interaction description unit 612 defines the content of each active control signal through a control information Y, and a feedback information Y is served to define the content of each active feedback signal. If the driver program 420 is able to identify the I/O device 200, the feedback information Y and the control information Y are enabled to describe each active device status, such as: rotating angle, gear shift, vibration strength and resistance strength, and the process procedure 421 is able to process with respect to the process procedure corresponding to the described device status.

If the driver program 420 is unable to identify the I/O device 200, then the third device index chart 620 is established. Columns of the third device index chart 620 comprise a device description unit 621 and an interaction description unit 622, wherein the device description unit 621 defines the relevant information of the I/O device 200, such as device type, name, version, etc.; and feedback information Z and control information Z of the interaction description unit 622 comprise raw data. The raw data is processed by the process procedure 421 with respect to the process procedure corresponding to the unknown device.

Figure 3:
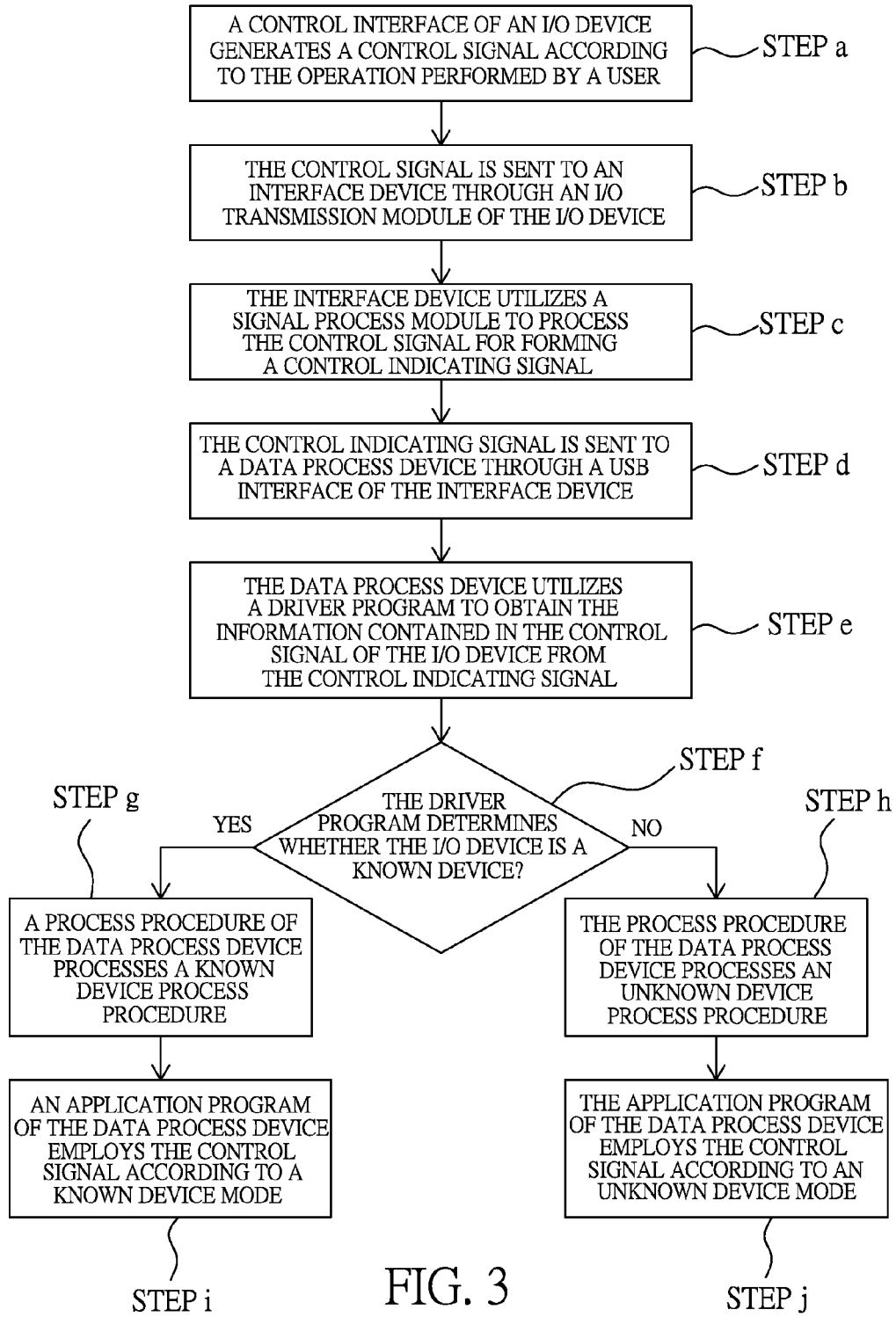
FIG. 3 is a schematic view illustrating the process steps of a control signal being formed by one of the I/O devices shown in FIG. 1 according to one embodiment of the present invention.

Referring to FIG. 3, which is a schematic view illustrating the process steps of a control signal being formed by one of the I/O devices shown in FIG. 1 according to one embodiment of the present invention. As shown in FIG. 3, the process steps comprise: a control interface of an I/O device generates a control signal according to the operation performed by a user (step a); the control signal is sent to an interface device through an I/O transmission module of the I/O device (step b); the interface device utilizes a signal process module to process the control signal for forming a control indicating signal (step c); the control indicating signal is sent to a data process device through a USB interface of the interface device (step d); the data process device utilizes a driver program to obtain the information contained in the control signal of the I/O device from the control indicating signal (step e); the driver program determines whether the I/O device is a known device? (step f); a process procedure of the data process device processes a known device process procedure (step g); the process procedure of the data process device processes an unknown device process procedure (step h); an application program of the data process device employs the control signal according to a known device mode (step i); and the application program of the data process device employs the control signal according to an unknown device mode (step j).

During the interaction, when the user rotates the I/O device 200 (formed as a force feedback wheel), the control interface 211 generates a control signal B describing the wheel rotating angle, and the control signal B is sent to the interface device 300 through a wired channel formed by the wired unit 221 and the transmission module 310. The signal process module 320 of the interface device 300 enables the control signal B to be formed as a control indicating signal having the content of the device description unit 511 such as the device type and name of the I/O device 200 and the content of the control information X relevant to the wheel rotating angle, and the USB interface 330 and the USB interface 410 of the data process device 400 are served for connection and communication. The driver program 420 processes the control indicating signal and determines whether the I/O device 200 is a known device, if the I/O device 200 is a known device, then the process procedure 421 performs the process procedure corresponding to the wheel rotating angle, for example: sending an incident of the wheel being rotated to the application program 430 (at this moment the application program 430 is a car racing application program); if the I/O device 200 is an unknown device, the process procedure 421 performs the corresponding process procedure to the whole control information Z by a raw data format, for example: sending an incident of updating control to the application program 430, then the application program 430 is able to analyze the altered wheel rotating angle from the content of the raw data. As such, even the driver program 420 is unable to identify the wheel rotating of the I/O device 200, the application program 430 is still able to obtain the information content of the control signal by analyzing the raw data, thereby achieving an objective of supporting a unknown I/O device.

Figure 4:
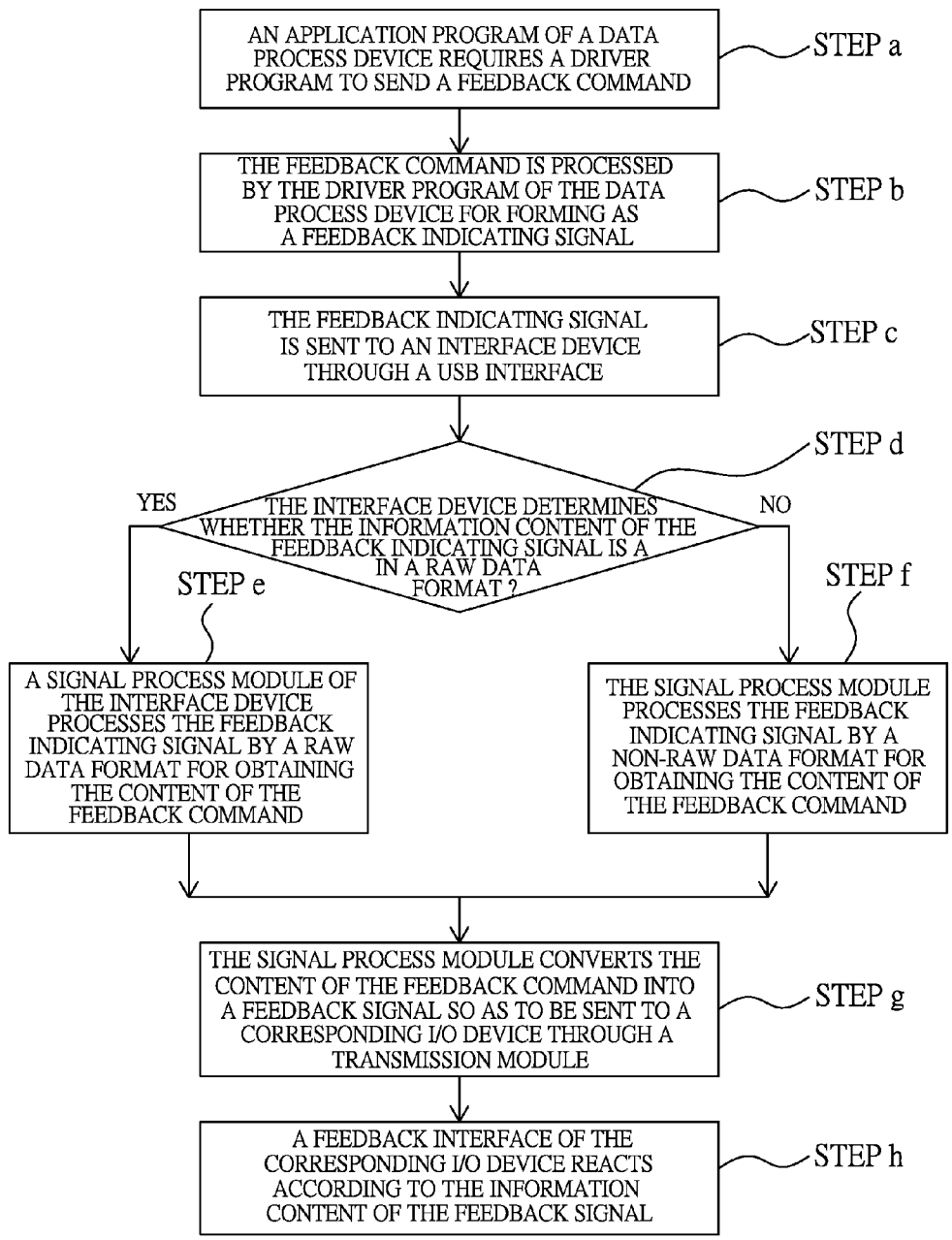
FIG. 4 is a schematic view illustrating the process steps of a feedback indicating signal being formed by the data process device according to one embodiment of the present invention.

Referring to FIG. 4, which is a schematic view illustrating the process steps of a feedback indicating signal being formed by the data process device according to one embodiment of the present invention. As shown in FIG. 4, the process steps comprise: an application program of a data process device requires a driver program to send a feedback command (step a); the feedback command is processed by the driver program of the data process device for forming as a feedback indicating signal (step b); the feedback indicating signal is sent to an interface device through a USB interface (step c); the interface device determines whether the information content of the feedback indicating signal is a in a raw data format (step d); a signal process module of the interface device processes the feedback indicating signal by a raw data format for obtaining the content of the feedback command (step e); the signal process module processes the feedback indicating signal by a non-raw data format for obtaining the content of the feedback command (step f); the signal process module converts the content of the feedback command into a feedback signal so as to be sent to a corresponding I/O device through a transmission module (step g); and a feedback interface of the corresponding I/O device reacts according to the information content of the feedback signal (step h).

During the interaction, for example when the application program 430 of the data process device 400 sends the feedback command containing the vibration strength and the rotating resistance strength of the wheel, if the driver program 420 is able to identify the I/O device 200, the application program 430 requires the process procedure 421 to send the feedback command according to a unknown device mode. For example: the process procedure 421 is able to monitor an incident of altering vibration strength and an incident of altering resistance strength sent by the application program 430, then the incidents are managed by the driver program 420 for forming as the above-mentioned feedback indicating signal having the content of the device description unit 611 such as the device type and name of the I/O device 200 and the content of the feedback information Y relevant to the vibration strength and the resistance strength of the wheel. If the driver program 420 is unable to identify the I/O device 200, the application program 430 requires the process procedure 421 to send the feedback command according to an unknown device mode, for example: the application program 430 sends an incident of updating feedback to the process procedure 421, the incident contains the feedback information relevant to the vibration strength and the resistance strength described by the raw data format, then the incident is managed by the driver program 420 for forming as the above-mentioned feedback indicating signal.

The feedback indicating signal is sent to the interface device 300 through the connection established by the USB interface 410 and the USB interface 330 of the interface device 300, if the feedback information contained in the feedback indicating signal is described by a non-raw data format, the signal process module 320 is able to record the feedback information describing the vibration strength and the resistance strength in the feedback signal directly through a communication channel defined by the channel description unit 512, and the feedback signal is sent to the I/O transmission module of the corresponding I/O device 200 through the transmission module 310; if the feedback information contained in the feedback indicating signal is in a raw data format, the signal process module 320 of the interface device 300 is able to analyze the content of the raw data for obtaining the description of the feedback information X relevant to the vibration strength and the resistance strength, then sent to the I/O transmission module of the corresponding I/O device 200 through the transmission module 310. Lastly, the feedback interface 212 of the I/O device 200 alters the vibration strength and the resistance strength according to the feedback signal, thereby allowing the user to enjoy the car racing interaction effect.

Figure 5:
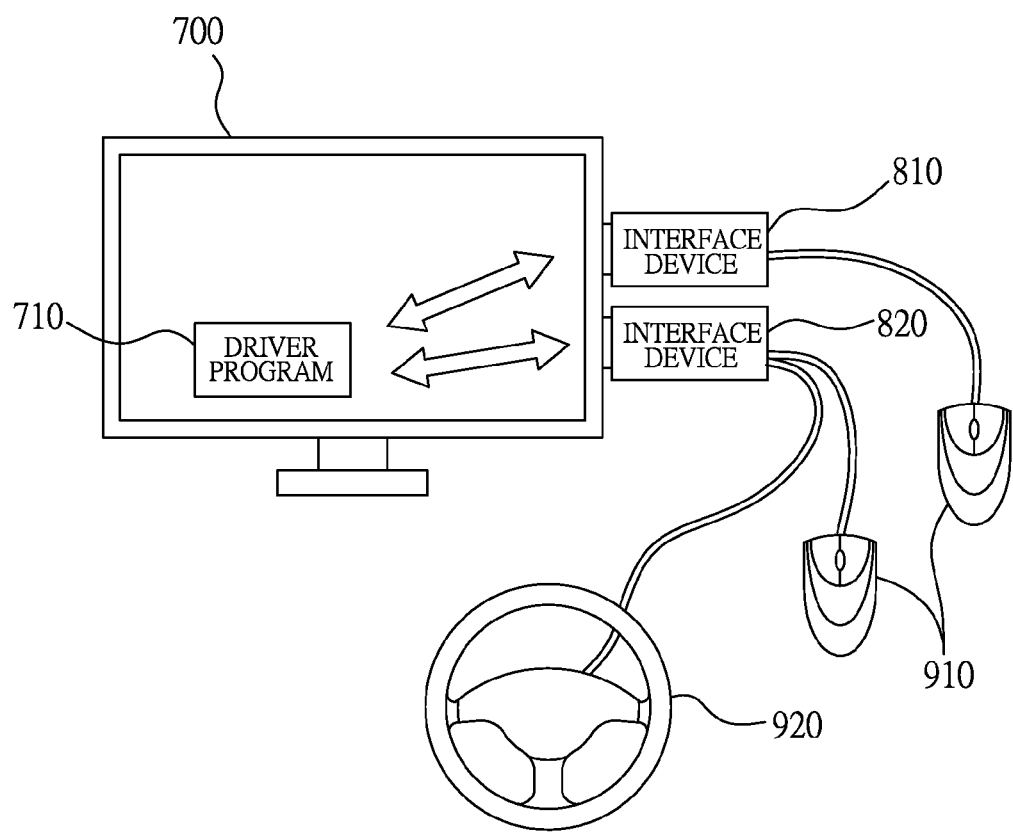
FIG. 5 is a schematic view illustrating an application of the interface device capable of supporting an unknown I/O device according to the present invention.

Referring to FIG. 5, which is a schematic view illustrating an application of the interface device capable of supporting an unknown I/O device according to the present invention. As shown in FIG. 5, an smart TV (no longer in production) is preset with a driver program 710 designed by the present invention, and the driver program 710 supports an interface device 810 (version 1.0), the interface device 810 can only connected to a mouse device 910. If a new car racing application program is launched in the smart TV 700, the mouse device 910 can be used for playing the game, and a wheel controlling device can also be used for playing the game. Because the interface device 810 does not support the wheel controlling device, the user is unable to enjoy a better game playing experience. As such, the developer of the interface device 810 can adopt an interface device 820 (version 2.0) designed by the present invention for solving the above-mentioned problem, wherein the interface device 820 can not only support the mouse device 910 but also support a wheel controlling device 920. Because the manufacturer of the smart TV 700 (no longer in production) does not update the driver program any more, only the design provided by the present invention can be adopted for allowing the user to enjoy a better operating experience while other means can no longer support the wheel controlling device 920.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be comprised within the scope of the appended claims. Although specific terms are employed herein, they are used in a generic and descriptive sense only and not for purposes of limitation.

What is claimed is:

1. An interface device capable of supporting an unknown I/O device, comprising:
   a transmission module, used for receiving a control signal sent by an I/O device and sending a feedback signal to said I/O device;
   a signal process module, used for generating a control indicating signal according to said control signal and generating said feedback signal according to a feedback indicating signal; and
   a USB interface, used for sending said control indicating signal to a data process device and receiving said feedback indicating signal from said data process device,
   wherein, information content of said control indicating signal and information content of said feedback indicating signal both include the information of a first device description unit and a first interaction description unit contained in a first device index chart,
   and wherein said data process device comprises a driver program, when said driver program is able to identify said I/O device through said first device index chart, a second device index chart is established; when said driver program is unable to identify said I/O device through said first device index chart, a third device index chart is established, wherein columns of said second device index chart comprise a second device description unit and a second interaction description unit, columns of said third device index chart comprise a third device description unit and a third interaction description unit, and said third interaction description unit comprises raw data.

2. The interface device capable of supporting an unknown I/O device of claim 1, wherein said I/O device comprises an interaction module and an I/O transmission module.

3. The interface device capable of supporting an unknown I/O device of claim 2, wherein said interaction module comprises a control interface.

4. The interface device capable of supporting an unknown I/O device of claim 2, wherein said interaction module comprises a feedback interface.

5. The interface device capable of supporting an unknown I/O device of claim 2, wherein said interaction module comprises a control interface and a feedback interface.

6. The interface device capable of supporting an unknown I/O device of claim 2, wherein said I/O transmission module comprises a wired unit.

7. The interface device capable of supporting an unknown I/O device of claim 2, wherein said I/O transmission module comprises a wireless unit.

8. The interface device capable of supporting an unknown I/O device of claim 2, wherein said I/O transmission module comprises a wired unit and a wireless unit.

9. The interface device capable of supporting an unknown I/O device of claim 1, wherein said data process device further comprises an application program interacting with said I/O device through said driver program.

10. The interface device capable of supporting an unknown I/O device of claim 9, wherein said application program is served to process by a raw data format when said driver program is unable to identify said I/O device.

* * * * *